United States Patent
Chaddha et al.

(10) Patent No.: US 7,483,525 B2
(45) Date of Patent: Jan. 27, 2009

(54) METHOD AND SYSTEM FOR SELECTING A COMMUNICATION CHANNEL WITH A RECIPIENT DEVICE OVER A COMMUNICATION NETWORK

(76) Inventors: Navin Chaddha, 11754 Ridge Creek Ct., Cupertino, CA (US) 95014; Adesh Desai, 12021 Doral Ave., Northridge, CA (US) 91326; Sanjeev Kuwadekar, 18223 Charlton La., Northridge, CA (US) 91326; Dan Sodhi, 12041 Doral Ave., Northridge, CA (US) 91326

( * ) Notice: Subject to any disclaimer, the term of this patent is extended or adjusted under 35 U.S.C. 154(b) by 740 days.

(21) Appl. No.: 10/852,849

(22) Filed: May 24, 2004

(65) Prior Publication Data
US 2005/0018820 A1  Jan. 27, 2005

Related U.S. Application Data

(60) Provisional application No. 60/520,471, filed on Nov. 13, 2003, provisional application No. 60/510,214, filed on Oct. 9, 2003, provisional application No. 60/472,994, filed on May 23, 2003, provisional application No. 60/472,990, filed on May 23, 2003, provisional application No. 60/472,989, filed on May 23, 2003.

(51) Int. Cl.
*H04M 1/56* (2006.01)
*H04M 7/00* (2006.01)
*H04M 3/00* (2006.01)
*G06F 15/173* (2006.01)

(52) U.S. Cl. .............. 379/142.07; 379/221.05; 379/265.02; 709/240

(58) Field of Classification Search ............... None
See application file for complete search history.

(56) References Cited

U.S. PATENT DOCUMENTS

| | | | | |
|---|---|---|---|---|
| 5,276,731 A | * | 1/1994 | Arbel et al. ............ 379/211.02 |
| 5,303,298 A | * | 4/1994 | Morganstein et al. .... 379/88.23 |
| 5,408,528 A | * | 4/1995 | Carlson et al. ......... 379/211.02 |
| 5,647,002 A | | 7/1997 | Brunson | |

(Continued)

FOREIGN PATENT DOCUMENTS

EP  1164774  12/2001

(Continued)

OTHER PUBLICATIONS

International Search Report of Counterpart PCT Application No. PCT/US2004/016448.

(Continued)

*Primary Examiner*—Curtis Kuntz
*Assistant Examiner*—Joseph T Phan
(74) *Attorney, Agent, or Firm*—Ash Tankha

(57) ABSTRACT

The present invention is directed to a system, method, device and machine readable medium for a selecting a recipient device or address with which a sender communicates. A sender using a sender device communicates with a recipient device selection server to indicate he wishes to communicate with a recipient. The sender indicates in what communication mode he wishes to communicate. The recipient device selection server determines all of the recipient devices and which communication modes they can receive. The recipient device selection server then selects a recipient device for the sender.

18 Claims, 9 Drawing Sheets

U.S. PATENT DOCUMENTS

| | | | | |
|---|---|---|---|---|
| 5,673,299 | A | * | 9/1997 | Fuller et al. ............ 379/210.03 |
| 5,742,905 | A | * | 4/1998 | Pepe et al. .................. 455/461 |
| 5,841,837 | A | * | 11/1998 | Fuller et al. ............ 340/825.49 |
| 5,930,702 | A | * | 7/1999 | Goldman et al. ............ 455/417 |
| 5,946,386 | A | * | 8/1999 | Rogers et al. .......... 379/265.09 |
| 6,058,415 | A | * | 5/2000 | Polcyn ........................ 709/200 |
| 6,069,943 | A | | 5/2000 | David et al. |
| 6,085,231 | A | | 7/2000 | Agraharam et al. |
| 6,104,789 | A | | 8/2000 | Lund |
| 6,104,913 | A | * | 8/2000 | McAllister ................. 455/41.1 |
| 6,125,176 | A | * | 9/2000 | Foladare et al. ........ 379/211.02 |
| 6,138,036 | A | | 10/2000 | O'Cinneide |
| 6,192,407 | B1 | | 2/2001 | Smith et al. |
| 6,203,192 | B1 | | 3/2001 | Fortman |
| 6,208,872 | B1 | | 3/2001 | Schmidt |
| 6,212,550 | B1 | | 4/2001 | Segur |
| 6,222,909 | B1 | | 4/2001 | Qua et al. |
| 6,246,871 | B1 | | 6/2001 | Ala-Laurila |
| 6,253,091 | B1 | | 6/2001 | Naddell et al. |
| 6,272,214 | B1 | | 8/2001 | Jonsson |
| 6,377,560 | B1 | | 4/2002 | Dailey |
| 6,477,240 | B1 | | 11/2002 | Lim et al. |
| 6,658,095 | B1 | * | 12/2003 | Yoakum et al. .......... 379/93.01 |
| 6,700,966 | B2 | * | 3/2004 | Takagi et al. ........... 379/201.06 |
| 6,981,223 | B2 | * | 12/2005 | Becker et al. ................ 715/753 |
| 7,035,923 | B1 | * | 4/2006 | Yoakum et al. ............. 709/224 |
| 7,389,351 | B2 | * | 6/2008 | Horvitz ...................... 709/227 |
| 2002/0078150 | A1 | | 6/2002 | Thompson et al. |
| 2002/0097856 | A1 | | 7/2002 | Wullert, II |
| 2002/0114432 | A1 | * | 8/2002 | Shaffer et al. ............ 379/90.01 |
| 2002/0177456 | A1 | | 11/2002 | Kimoto et al. |
| 2002/0191757 | A1 | | 12/2002 | Belrose |
| 2003/0022658 | A1 | | 1/2003 | Chapman, Jr. et al. |
| 2003/0068029 | A1 | | 4/2003 | McFarland |
| 2003/0092433 | A1 | | 5/2003 | Flannery |
| 2003/0095642 | A1 | | 5/2003 | Cloutier et al. |
| 2004/0176114 | A1 | | 9/2004 | Northcutt |

FOREIGN PATENT DOCUMENTS

WO     WO 03/030474     4/2003

OTHER PUBLICATIONS

Webpage, www.coremobility.com/solutions/vnotes.html.
Webpage, www.coremobility.com/solutions/vnotes_infrastructure.html.
Webpage, www.coremobility.com/news/11_23_04.html.
Partial International Search Report of Counterpart PCT Application No. PCT/US2004/016448.

* cited by examiner

METHOD AND SYSTEM FOR SELECTING A COMMUNICATION CHANNEL WITH A RECIPIENT DEVICE OVER A COMMUNICATION NETWORK

RELATED PATENT APPLICATIONS & INCORPORATION BY REFERENCE

This application is a utility application claiming the priority of the following U.S. provisional patent applications: Ser. No. 60/472,989, filed May 23, 2003; Ser. No. 60/472,990, filed May 23, 2003; Ser. No. 60/472,994, filed May 23, 2003; Ser. No. 60/510,214, filed Oct. 9, 2003; and Ser. No. 60/520,471, filed Nov. 13, 2003. These related application are incorporated herein by reference and made a part of this application as if fully set forth herein.

BACKGROUND OF INVENTION

1. Field of the Invention

The present invention relates to communicating over a network, particularly to selecting a recipient device with which to communicate.

2. Description of Related Art

Communication can become quite complicated in today's world. Referring to FIG. 1, a sender 40 attempting to communicate with a recipient over a network 52 will often have to evaluate many factors to decide the best channel to communicate with a recipient. The recipient may have many types of communication devices, such as a home phone 50, work phone 48, cellular phone 42, personal computer 44, work computer 46, and VoIP phone, pager, PDA (not shown) with which he may be contacted. A sender 40 is required to decide with which recipient device 42, 44, 46, 48, 50 he should target, or resort to attempting each one at a time, until the right device is found. Furthermore, the sender 40 may desire to communicate to the recipient using a specific communication mode, for example, by voice mail messaging 54. Some of the recipient devices 42, 44, 46, 48, 50 may not be able to receive a voice mail messaging 54. Thus, when communicating with a recipient, the sender 40 is required to keep a mental log of multiple recipients, all of the recipient devices 42, 44, 46, 48, 50 each recipient possesses, as well as the available communication modes of each recipient device. Furthermore, some recipient devices 42, 44, 46, 48, 50 may not always be in use. For example, the work phone 48 of the recipient may only be used during work hours, but not otherwise.

U.S. Pat. No. 6,477,240 to Lim et al. teaches a method for creating an end-to-end connection between a first telephone and a communication device through a unified messaging system. The creation of the end-to-end connection between the first telephone and the communication device is performed responsive to verbal input from a user of the first telephone. The method includes receiving at the unified messaging system the verbal input from the user through the first telephone. The method further includes performing voice recognition on the verbal input. There is also included detecting an action word from the verbal input after the performing voice recognition. The action word is indicative of a communication service desired by the user in creating the end-to-end connection. Additionally, there is included detecting at least one of a called party identity and contacting data from the verbal input after the detecting the action word. While the method of Lim teaches a voice-activated system to select a called party, there is no teaching directed to a system selecting a recipient device for a sender based upon the chosen communication mode of the sender, or on the capabilities of the recipient's devices. A sender is still required to determine these factors himself.

Accordingly, it is desirable to provide an improved communication method that selects a recipient device for a sender. It would be desirable that the improved communication method selects the best available communication mode and/or a compatible recipient device to the sender's choice of communication mode. Furthermore, it would be desirable that the improved communication method formats the sender's communication mode if it is not compatible with a recipient device. Moreover it would be desirable that the improved communication method account for a multitude of desirable criteria when selecting a recipient device including whether the recipient is present with a recipient device and also account for the nature of the presence.

SUMMARY OF INVENTION

The present invention is directed to an improved method and system for selecting a recipient device with which a sender can communicate. In one embodiment of the present invention, a sender using a sender device such as a cellular phone, personal digital assistant (PDA), personal computer or landline phone communicates with a call manager to indicate he wishes to communicate with a recipient. The sender indicates in what communication mode he wishes to communicate, for example, a phone call, electronic mail, instant message, voicemail message, text message and the use of a messaging system. The call manager implements a multitude of criteria to select an appropriate recipient device for the sender. The criteria may include the preferences of the sender, the preferences of the recipient, the compatibility of the sender device and the recipient device, the history of use of a recipient device by the sender and recipient, the presence of the recipient and the time of the communication, and the history of the availability of the recipient devices. A heuristic approach may be adopted to consider these criteria.

In another embodiment, if no recipient device can receive the communication mode selected by the sender, then the call manager formats the sender's communication mode so that a recipient device can communicate with the sender.

In yet another embodiment, a voice-activated system is implemented allowing the sender to issue voice commands.

DESCRIPTION OF THE ILLUSTRATED EMBODIMENTS

The present description is of the best presently contemplated mode of carrying out the invention. This description is made for the purpose of illustrating the general principles of the invention and should not be taken in a limiting sense. The scope of the invention is best determined by reference to the appended claims.

The present invention is directed to a method, system, server, user device and machine-readable medium for selecting a recipient device with which to communicate. To facilitate an understanding of the principles and features of the present invention, they are explained herein below with reference to its deployments and implementations in illustrative embodiments. By way of example and not limitation, the present invention is described herein-below in reference to examples of selecting a recipient device over a single or multiple networks and, more particularly, a method and a system are disclosed for selecting a recipient device with which to communicate where the communication method may comprise a voice channel, a voice message, a text message, an electronic mail, an instant message and a messaging server.

The present invention can find utility in a variety of implementations without departing from the scope and spirit of the invention, as will be apparent from an understanding of the principles that underlie the invention. It is understood that the messaging concepts of the present invention may be applied to business and personal communications, and may be implemented by commercial as well as private communication networks.

Figure 1:
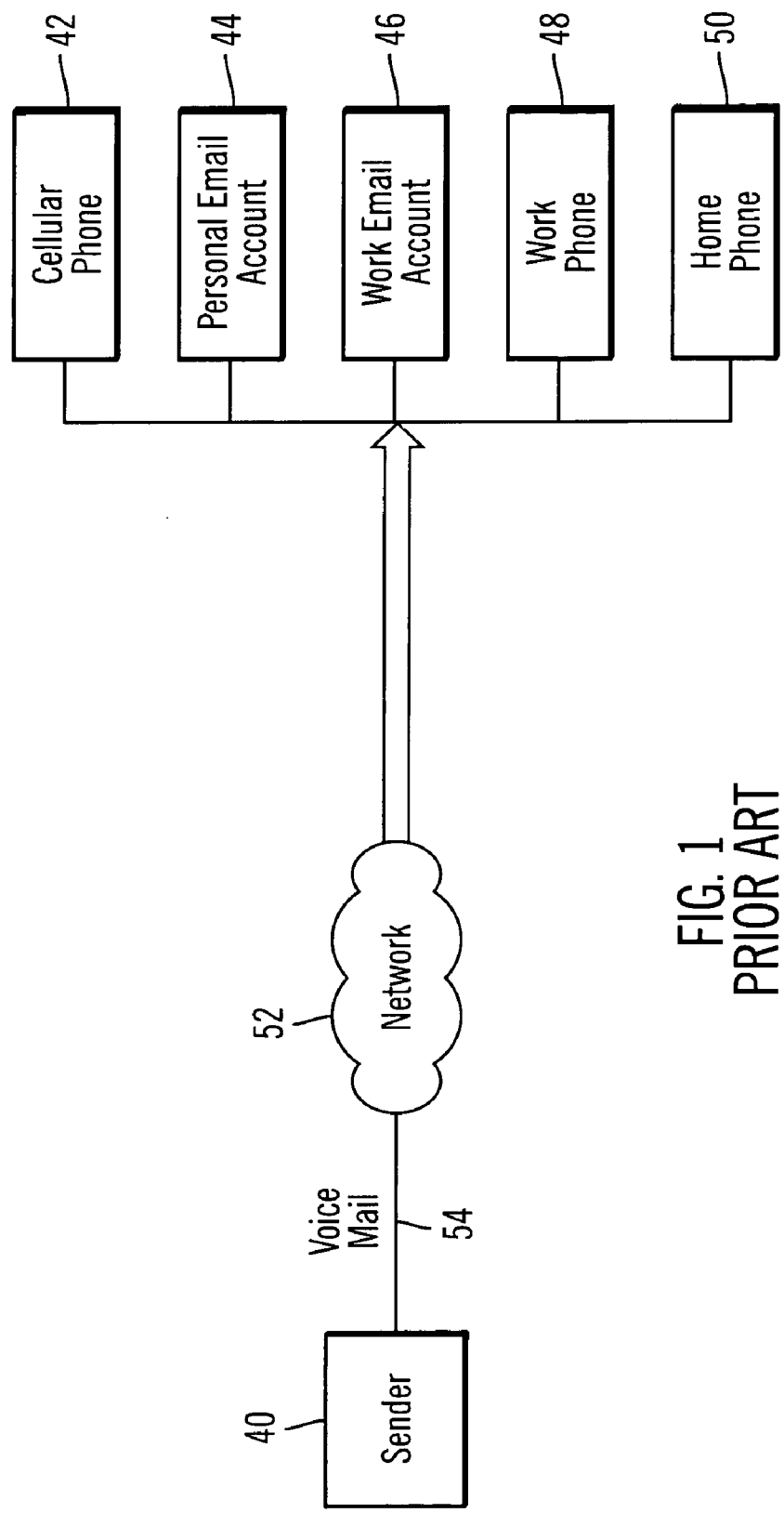
FIG. 1 is a schematic representation of a prior art method of a sender selecting a recipient device with which to communicate.
Figure 2:
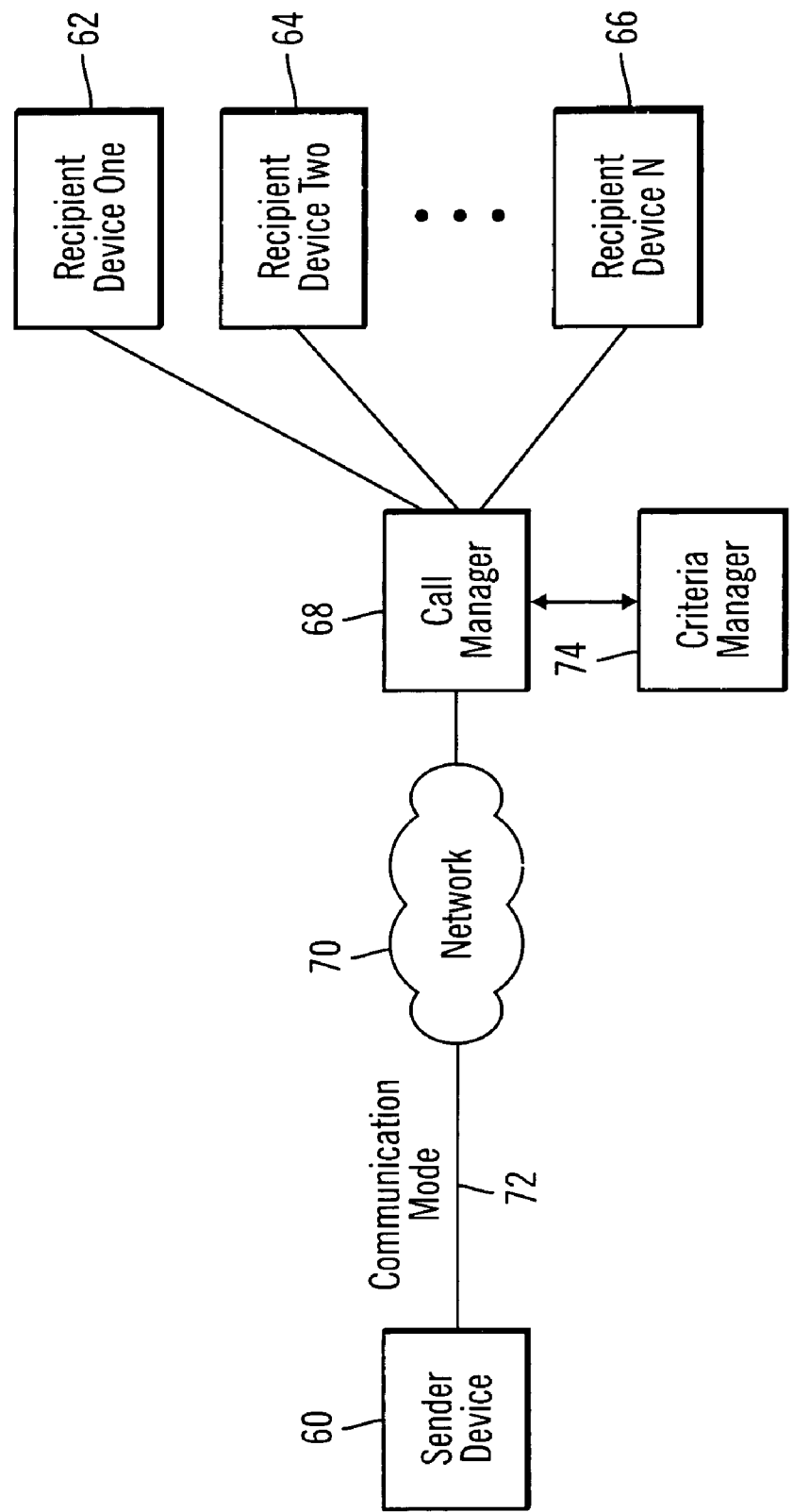
FIG. 2 is a schematic representation of a call manager which selects a recipient communication device with which a sender device communicates, according to an embodiment of the present invention.
Figure 8:
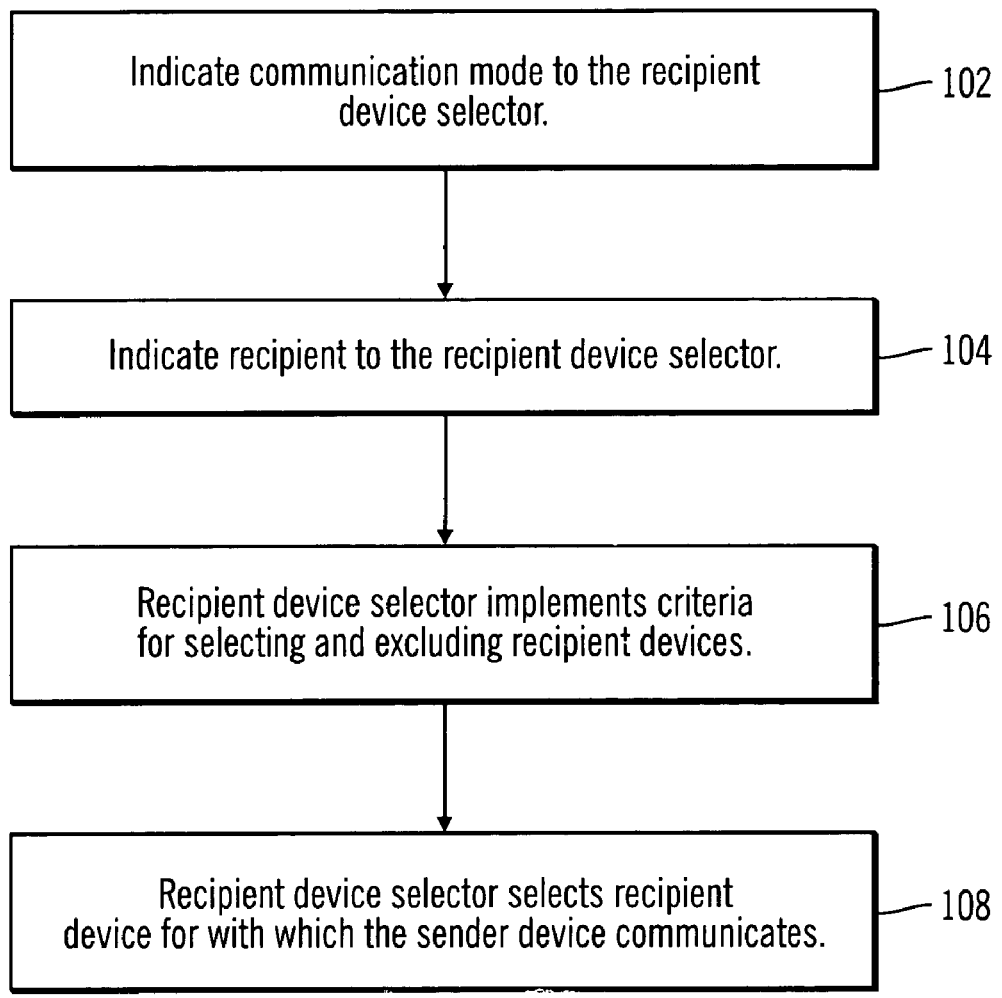
FIG. 8 is a flowchart illustrating a method for selecting a recipient device according to one embodiment of the present invention.

FIG. 2 is a diagram illustrating an embodiment of the present invention where a call manager 68 is used to select a recipient device 62, 64, 66 (each having a unique address, such as a telephone number, IP address, etc.) with which a sender device 60 communicates. FIG. 8 is a flowchart of the method for selecting a recipient device illustrated in FIG. 2. A sender wishes to communicate to a recipient by communicating through a sender device 60 where the recipient has a plurality of different devices 62, 64, 66. The sender device 60 communicates to the call manager 68 through a network 70. The sender device 60 indicates at step 102 to the call manager 68 the communication mode 72 with which the sender wishes to communicate. The sender may use voice or other user inputs via interfaces available at the sender device or at the call manager 68. The sender also indicates at step 104 which recipient he would like to communicate. The call manager interacts with a criteria manager 74 which implements at step 106 criteria for selecting and excluding recipient devices. Using the criteria manager 74, the call manager 68 selects 108 the recipient device 62, 64, 66 for with which the sender device 60 communicates. The call manager 68 may select a single or multiple recipient devices.

A sender device and recipient device may comprise a cellular phone, landline phone, computer and a personal digital assistant (PDA). A sender and recipient may have one or more of such devices. Generally a sender device and recipient device may be a terminal node that is an end point for a data or analog transmission. A communication mode may comprise a voice channel over a (public-switch telephone network) PSTN, a wide-area network (WAN), or a cellular network, as well as a voicemail message, electronic mail, and a text message. A sender device and recipient device may have single or multiple communication modes. For example, a landline phone may be only able to communicate through a voice channel, while a cellular phone may be able to communicate through a voice channel, text message, and electronic mail. Each sender device and recipient device may have a single unique communication address or multiple communication addresses corresponding to each communication mode. For example, a cellular phone may have a phone number as well as an associated email address. A home computer may have a personal electronic mail account; a work computer may have an IP address, VoIP phone address, a work electronic mail account; a work phone may have a work phone number; and a home phone may have a home phone number.

Figure 3:
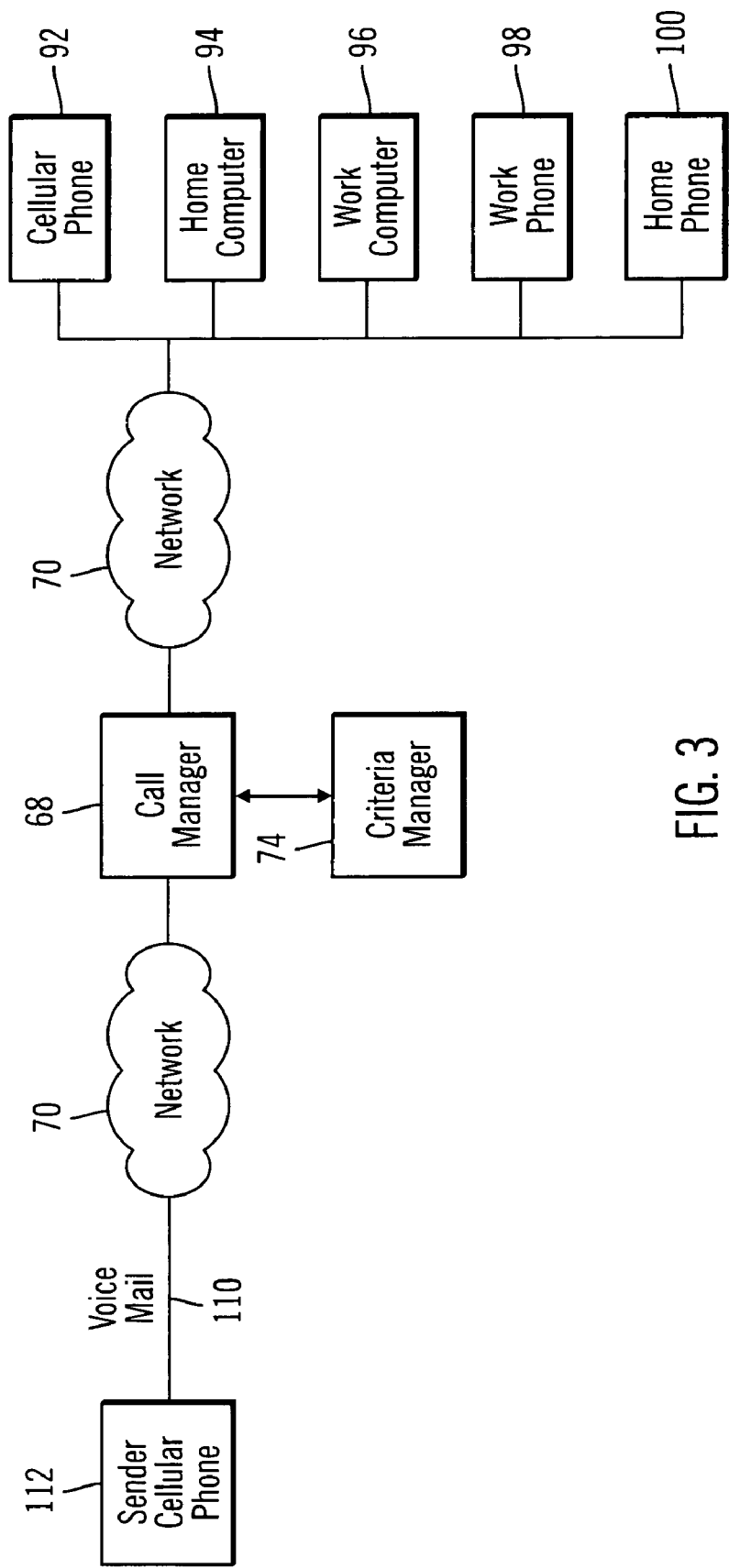
FIG. 3 a schematic representation of a call manager which selects a recipient communication device, including a cellular phone, home computer, work computer, work phone, home phone, with which a sender cellular phone communicates, according to an embodiment of the present invention.

FIG. 3 is a diagram illustrating an embodiment where a recipient has several devices including a cellular phone 92, home computer 94, work computer 96, work phone 98, and home phone 100. The sender device is a cellular phone 112. The communication mode used by the sender is a voicemail messaging 110. The sender wishes to communicate to a recipient by communicating through the cellular phone 112 to one recipient device 92, 94, 96, 98, 100. The cellular phone 112 communicates to the call manager 68 through a network 70. The cellular phone 112 indicates to the call manager 68 that a voicemail message 110 is to be sent. The sender also indicates which recipient he would like to communicate. The call manager 68 interacts with a criteria manager 74 that implements criteria for selecting recipient devices. Using the criteria manager 74, the call manager 68 selects the cellular phone 92 as the cellular phone is capable of receiving a voicemail message 110.

Figure 4:
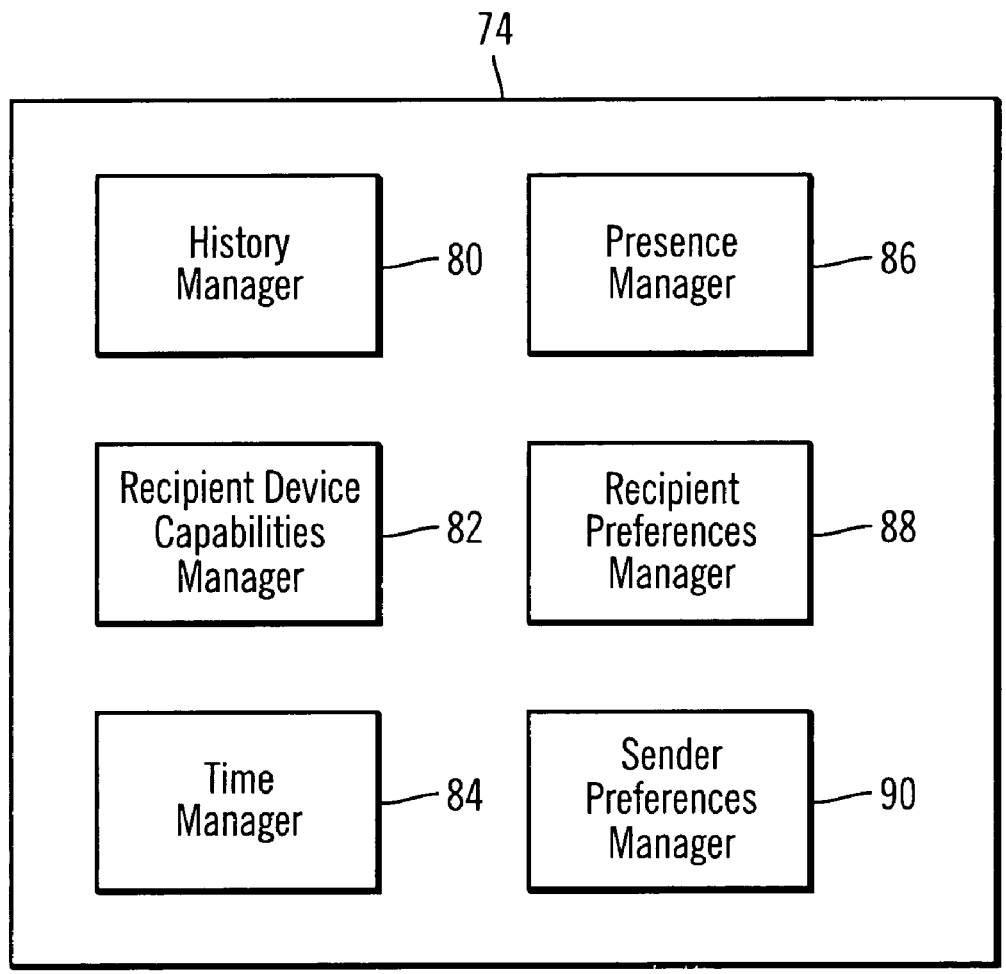
FIG. 4 is a schematic representation of a call manager according to an embodiment of the present invention.

FIG. 4 is a diagram illustrating an embodiment of the criteria manager. The criteria manager may comprise sub-managers that each handles one or more types of criteria. In one embodiment, the sub-managers comprise a history manager 80, presence manager 86, recipient device capabilities manager 82, recipient preferences manager 88, time manager 84 and a sender preferences manager 90. The sub-managers may function independently or may function integrally with one another.

In one embodiment, the recipient device capabilities manager 82 selects those recipient devices that are capable of communicating in the communication mode selected by the sender. The recipient device capabilities manager-may also exclude from consideration those recipient devices that cannot communicate in the mode selected by the sender. For example, the sender may choose to send an electronic mail. A work computer is capable of receiving the electronic mail and thus is included as a possible choice of recipient device. A recipient device such as a landline phone typically cannot receive an electronic mail, and thus would be excluded as a possible recipient device.

In one embodiment, the history manager 80 evaluates past selections of recipient devices and makes present selections based upon the past selections. In one embodiment, past selections of the recipient devices by the sender are evaluated and a ranking between recipient devices is created based upon the past selections. Those recipient devices selected more frequently are placed higher in the ranking than those selected less often. For example, in the past, a sender has selected a recipient cellular phone as a recipient device more than a recipient home phone. The cellular phone is placed higher in the ranking than the home phone because the cellular phone has been selected more frequently. Thus, the cellular phone is likely to be selected again in the future.

In another embodiment, the recipient's past usage of her recipient devices is evaluated. A ranking is created between recipient devices based upon their usage for both accepting a communication and initiating a communication. Thus, how much a recipient uses her own devices is taken into account. In one embodiment, the history manager may also evaluate the time at which past selections have been made and may vary the rankings based on, for example, the time of day or day of the week. For example, a work phone and work electronic mail may be used frequently during working hours, but during non-working the work phone and work electronic mail are not used at all. The history manager could exclude the work phone and work electronic mail as possible recipient devices during non-working hours. Alternatively, the history manager may give the work phone and work electronic mail a low ranking during non-working hours.

The presence manager 86 evaluates the recipient devices to assess if the recipient is present. Depending on the nature of the recipient's presence, a recipient device may be excluded from selection. In one embodiment, the presence manager may determine if the recipient is present at the recipient device, and if the recipient is not present, the recipient device is excluded. For example, if the recipient device is a computer, and the presence manager detects that the recipient computer is not on or is sitting idle after a time-out, then the recipient is determined to not be present, and the computer will be excluded as a recipient device. In another embodiment, the nature of the presence of the recipient may be evaluated. For example, if the recipient device is a cellular phone, and the presence manager detects that the cellular phone is moving, then the presence manager 86 will determine that the recipient is present with the cellular phone as she is the one causing the cellular phone to move. However, the cellular phone may be excluded as a recipient device, if for example, the recipient prefers that she not be contacted by cellular phone while she is traveling. Example of presence management products include the Oz Instant Messaging and Presence Services Server, and the Oz Instant Messaging and Presence Services J2ME Client produced by OZ Communications, Inc of Montreal, Canada, presence solution products including Odigo Express and Odigo Messenger produced by Odigo Inc. and dynamicsoft Presence Engine produced by dynamicsoft Inc. of Parsippany, N.J. and each of these products is herein incorporated by reference.

In one embodiment, the recipient preferences manager 88 evaluates the preferences of the recipient as to which recipient device she wishes to be contacted. The recipient preferences manager 88 allows the recipient to establish a ranking for selection between the recipient devices as well as criteria for inclusion or exclusion of the recipient devices. Referring to FIG. 3, in one exemplary embodiment of setting a ranking between recipient devices, the recipient may choose that she be contacted first by cellular phone 92 and second by personal electronic mail on her home computer 98. She may then designate that her work electronic mail 96, work phone 98 and home phone 100 be the next in order of selection. In one exemplary embodiment of excluding a recipient device, as previously described, the recipient may set in her profile such that when she is traveling, her cellular phone is excluded as recipient device.

In one embodiment, the time manager 84 allows the sender and/or recipient to set time related criteria for selecting, including, and/or excluding recipient devices. The time manager 84 also allows the sender to program a time in the future when his communication will be sent. In one exemplary embodiment where the sender sets time related criteria for selecting, including, and/or excluding recipient devices, the sender may wish not to speak with a recipient during the sender's working hours. During this period, the sender may not have the time to engage in polite conversation which is often required in a phone conversation. Using the time manager 84, the sender may exclude recipient devices whose communication mode is an open channel such as a work phone or a home phone during working hours. In one exemplary embodiment, where the sender programs a time in the future when his communication will be sent, the sender records a voicemail message with the call manager 68. The sender may wish to defer the sending of the voicemail message for reason such as he does not wish the recipient to receive the voicemail message during working hours because the voice mail will interrupt the recipient at work. Using the time manager, the sender instructs the call manager to transmit the voice mail during non-working hours.

The sender preferences manager 90 allows the sender to create a profile that instructs the call manager to select, exclude, include and/or implement a ranking for selecting recipient devices. In one exemplary embodiment of excluding a recipient device, if a sender does not want to communicate with the recipient's work phone, the sender may use the sender preferences manager to exclude the recipient work phone from being selected. In one exemplary embodiment where the sender creates a ranking among the recipient devices, the sender prefers to contact the recipient at home before contacting the recipient at work. The sender may rank the recipient devices in an order of selection whereby the recipient devices associated with the recipient's home are selected before recipient devices associated with the recipient's work.

In one embodiment, the criteria manager implements multiple sub-managers. In one aspect of this embodiment the sub-managers are implemented according to a ranking. The selections made by a manager having a higher rank take precedence before a selection made by a manager of a lower rank. If there is a conflict between the managers on the selection of a recipient device, the selection made by a manager of higher rank will take precedent. If there is only one recipient device available, the available recipient device is selected. One or more managers may be used to reduce the number of recipient devices for consideration.

Figure 5:
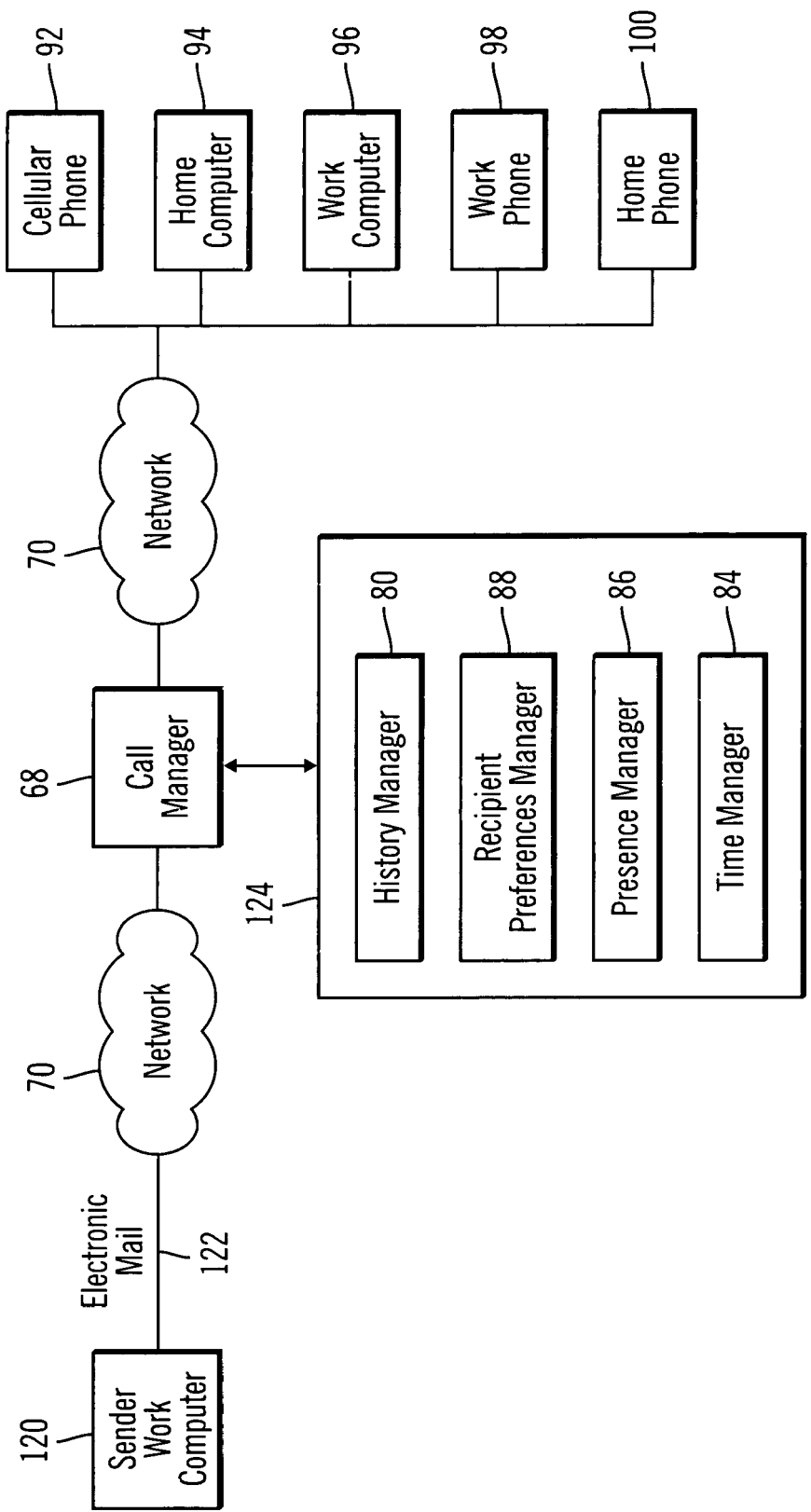
FIG. 5 is a schematic representation of a call manager having a recipient preferences manager, presence manager, history manager and a time manager according to an embodiment of the present invention.

FIG. 5 is a diagram illustrating an embodiment where the call manager 68 implements the criteria sub-managers 88, 86, 80, 84 in a hierarchical order. When the sub-managers 88, 86, 80, 84 are implemented together, there may be a conflict in the selection of recipient device 92, 94, 96, 98, 100. A first sub-manager may choose a recipient device while a second sub-manager may choose another recipient device. A second sub-manager may even exclude the selected recipient device of a first sub-manager. The sub-managers 88, 86, 80, 84 may be implemented by rank whereby the choice of one sub-manager takes precedence of the choice of a lower sub-manager.

In this embodiment, a sender wishes to send an electronic mail 122 to a recipient using a work email account through his work computer 120. The criteria manager 124 may implement four sub-managers in the following order, history manager 80, recipient preferences manager 88, presence manager 86 and time manager 84. The recipient has as recipient devices, a cellular phone 92, personal electronic mail 94, work electronic mail 96, work phone 98, and home phone 100. The recipient preferences manager 88 indicates that the order of selection of the recipient devices is a cellular phone 92, personal electronic mail 94, work electronic mail 96, work phone 98, and home phone 100. The recipient preferences manager 88 indicates that the recipient does not wish to communicate by cellular phone 92 when she is traveling. The presence manager 88 indicates that the recipient is traveling so the cellular phone 92 is excluded as a recipient device. The history manager 80 indicates that the recipient typically communicates with her work electronic mail 96 during working hours, for example, between 9 am to 5 pm. The time manager 84 indicates that the current time 2 pm, so the recipient's work electronic mail 96 is selected as the recipient device.

Figure 6:
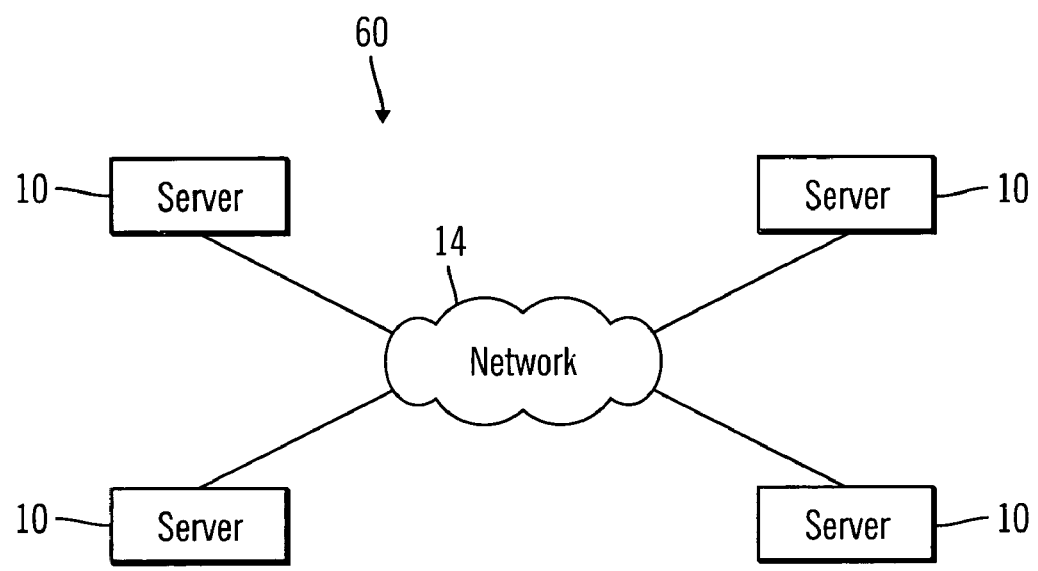
FIG. 6 is a schematic representation of one embodiment of a computer network through which the recipient device selection method, device, machine-readable medium and system of the present invention may be implemented.

Referring to FIG. 6, in one embodiment, the call manager 60 comprises many servers 10 that are inter-connected via the Internet network 14, which comprises a large number of connected information networks that act as a coordinated whole. Details of various hardware and software components comprising the Internet network 14 are not shown (such as servers, routers, gateways, etc.) as they are well known in the art. Further, it is understood that access to the Internet network 14 by the servers 10 may be via suitable transmission medium, such as coaxial cable, telephone wire, wireless RF links, or the like. Communication between the servers 10 takes place by means of an established protocol. As will be noted below, the call manager of the present invention may be configured in or as one of the servers 10.

Figure 7:
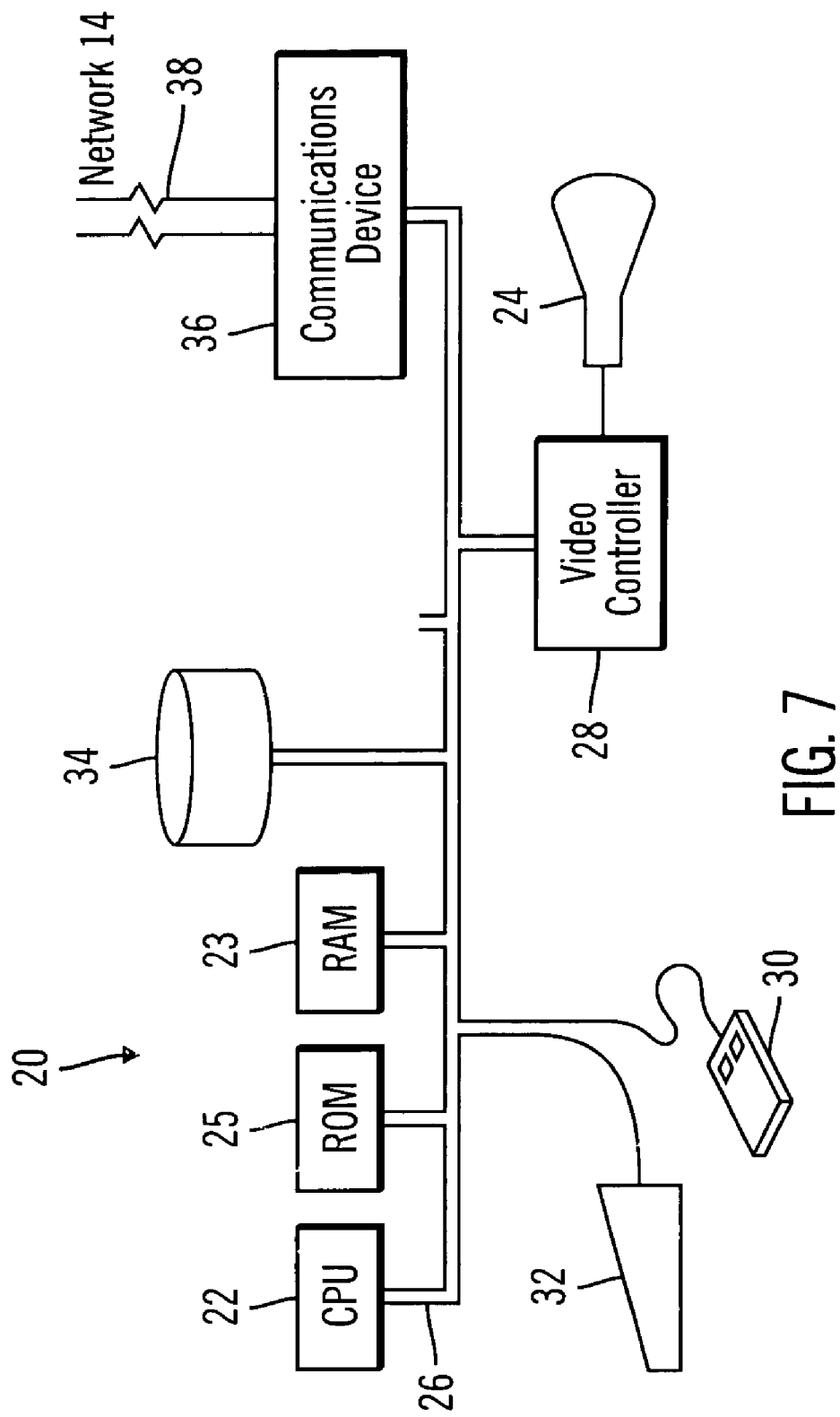
FIG. 7 is a schematic representation of one embodiment of a computer system that facilitates the recipient device selection method, device, server, machine-readable medium and system of the present invention.

Turning now to FIG. 7, there is schematically illustrated one embodiment of a computer system 20 which may be configured as the call manager 60 for receiving, storing and/or transmitting messages. The computer system 20 communicates with the Internet network 14 as well as cellular networks and PSTN's. The computer system 20 includes a processor 22, internal random-access memory ("RAM") 23 and read-only memory ("ROM") 25, and data bus architecture 26 for coupling the processor 22 to various internal and external components. The computer system 20 further includes a communication device 36 which, in turn, is coupled to a communication channel 38 for effecting communication with the Internet network 14. A mass storage device 34, such as a hard disk drive or floppy disk drive or CD-ROM drive, is coupled to the processor 22 for storing utility and application software (including a suitable web browser for navigating the Internet network) and other data. The application software is executed or performed by the processor 22.

Input devices controlled by the user are also coupled to the processor 22, including a cursor positioning device 30 and a keyboard 32 in accordance with the present invention. The cursor positioning device 30 is representative of any number of input devices that produce signals corresponding to a cursor location on a display 24, and may include by way of example, a mouse, a trackball, an electronic pen, or a touchpad, which may be an integral part of the keyboard 32. The display 24 is coupled to the processor 22 through a video controller 28. The video controller 28 coordinates the presentation of information on the display 24 in one or more windows. Generally, the windows are scalable, thus permitting a user to define the size and location of a particular window on the display 24.

The call manager herein described may involve, without limitation, distributed information exchange networks, such as public and private computer networks (e.g., Internet, Intranet, WAN, LAN, etc.), value-added networks, communications networks (e.g., wired or wireless networks), broadcast networks, and a homogeneous or heterogeneous combination of such networks. As will be appreciated by those skilled in the art, the networks may include as both hardware and software and can be viewed as either, or both, according to which description is most helpful for a particular purpose. For example, the call manager can be described as a set of hardware nodes that can be interconnected by a communications facility, or alternatively, as the communications facility, or alternatively, as the communications facility itself with or without the nodes. It will be further appreciated that the line between hardware and software is not always sharp, it being understood by those skilled in the art that such mediums and communications facility involve both software and hardware aspects.

A method or process is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Useful devices for performing the operations of the present invention include, but are not limited to, general or specific purpose digital processing and/or computing devices, which devices may be standalone devices or part of a larger system. The devices may be selectively activated or reconfigured by a program, routine and/or a sequence of instructions and/or logic stored in the devices. In short, use of the methods described and suggested herein is not limited to a particular processing configuration. Prior to discussing details of the inventive aspects of the present invention, it is helpful to discuss one example of a network environment in which the present invention may be implemented.

It is appreciated that detailed discussion of the actual implementation of the call manager is not necessary for an enabling understanding of the invention. The actual implementation is well within the routine skill of a programmer and system engineer, given the disclosure herein of the system attributes, functionality and inter-relationship of the various functional modules in the system. A person skilled in the art, applying ordinary skill can practice the present invention without undue experimentation.

Figure 9:
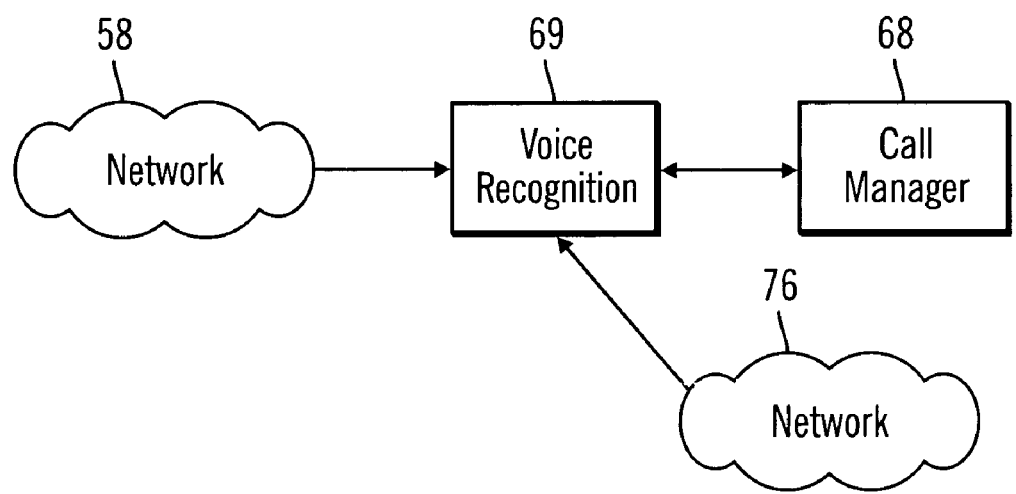
FIG. 9 is a schematic representation of a call manager and a voice recognition device according to one embodiment of the present invention.

Referring to FIG. 9, in an embodiment, the call manager 68 is configured with a voice-recognition unit 69 implementing voice-recognition processing. An example of voice-recognition processing includes a suite of Voice Manager Products produced by HeyAnita Inc. of Burbank, Calif. and is herein incorporated by reference. Another example of voice-recognition programming is disclosed in U.S. Pat. No. 6,501,966 to Bareis et. al. and is herein incorporated by reference as well. In this embodiment, the sender may pre-program contact information including a recipient's name and phone number, and associate the phone number with a recipient's name. When communicating with a recipient, the sender may speak the name of the recipient and the call manager 68 will identify the recipient's contact information and the recipient devices using the voice-recognition unit 69. If the recipient's device addresses have not been pre-programmed, the sender may speak the recipient's address, and the call manager will identify the recipient's phone number using the voice-recognition unit 69. Examples of commands that may be implemented by voice recognition as well as DTMF recognition include, but are not limited to, selecting a recipient, bringing up a contact list, adding a contact, removing a contact, stopping a communication and entering additional recipient devices with which to communicate.

In an embodiment, the call manager implements a messaging system as a type of communication mode. In this messaging system, data files are communicated to a recipient by being first transmitted and stored on a messaging server. The messaging server then sends a notification message to the recipient that she has a data file to be retrieved. The notification message contains an address with which the recipient may use to retrieve the message. The data file may comprise a voice message, text document, musical file, picture file, executable file and multimedia file. The address may comprise a phone number or a web address. The recipient accesses the address to receive her data file. This messaging system is detailed in copending U.S. patent application Ser. No. 10/852,845, entitled "A Method and System for Communicating a Data File Over a Network", which is concurrently filed on May 24, 2004, and commonly assigned to the assignee of the present invention. The disclosure of which is incorporated herein by reference as if fully set forth herein. Cross-reference is also made to copending U.S. patent application Ser. No. 10/852,848, entitled "A Method and System for Establishing a Teleconference Over a Telephony Network", which is concurrently filed on May 24, 2004, and commonly assigned to the assignee of the present invention. This copending application is incorporated by reference herein as if fully set forth herein. The present invention may be used to select the teleconference notification messaging disclosed in said application as the most appropriate mode or channel of communication when establishing a teleconference.

The messaging system may be used as a primary communication mode or as a secondary communication mode. When used a primary communication mode, the messaging server is included as choice to be selected among recipient devices. When used as a secondary communication mode, the messaging server is used when a primary communication mode cannot be selected or is unavailable for a period of time. For example, a sender wishes to transmit a voicemail message to the recipient. The recipient can receive the voicemail message through her cellular phone, but she is currently traveling, so the cellular phone cannot be selected as a recipient device. The messaging server may store the voicemail message and transmit a text notification message to the recipient cellular phone, whereby she can receive the voicemail message when she is no longer traveling.

In one embodiment, the communication mode chosen by the sender is not compatible with any of the recipient devices. In this embodiment, a recipient device is selected and the communication of the sender is transformed into a compatible communication mode for the recipient device. In one exemplary embodiment, a communication mode such as a voice message is converted from a text message to a voice message. The sender has selected to transmit a text message, but no recipient device is capable of receiving the text message. A landline phone is selected as a recipient device. A text message is inputted into the sender device and the text message is converted to a voice message using a text-to-speech conversion process. With text-to-speech conversion, the text message is converted to audible sounds, allowing the recipient to hear the text message as a voice message. The text message may be converted to a voice message by the sender device or may be converted by the call manager.

In another exemplary embodiment, a sender wishes to send a voice message. There are no recipient devices that can receive a voice message, but there is a personal computer (PC) that can receive a text message. In this embodiment, speech-to-text processing may be used to convert the sender's speech into a text message which is then sent to the PC.

Accordingly, it is to be understood that the invention is not to be limited by the specific illustrated embodiments, but only by the scope of the appended claims.

The invention claimed is:

1. A method of selecting a recipient address from a plurality of recipient addresses by a criteria manager for a sender to communicate with a recipient over a network, comprising:
   communicating a selection of the recipient by the sender to a call manager;
   determining a communication mode for each of said recipient addresses by the call manager, wherein said call manager uses a criteria manager to determine said communication mode;
   transmitting the identity of the recipient by said call manager to said criteria manager, wherein said criteria manager is in communication with one or more criteria sub-managers;
   selecting the recipient addresses by the criteria manager, wherein said selection is based on a ranking of the recipient address by the criteria sub-managers, and wherein said sub-managers comprise a history sub-manger, wherein the history sub-manager is ranked the highest of the sub-manager and the history sub- manager determines the most frequently used recipient address based on past selection and selecting the most frequently used recipient address based on past selection by the criteria manager; presence sub-manager, recipient device capabilities sub-manager, recipient preferences sub-manager, time sub-manager, and a sender's preference sub-manager;
   communicating the selected recipient address by the criteria manager to the call manager; and
   implementing communication between the sender and the recipient by said call manager on the selected recipient address.

2. The method of claim 1, wherein the recipient address comprises any of a cellular phone address, voice over Internet protocol call address, and a landline phone address.

3. The method of claim 1, wherein the recipient address comprises any of an electronic mail, text message address, and an Internet instant message address.

4. The method of claim 1, wherein said communication mode for the recipient address comprises any of a text message, a voice message, a multimedia messaging service message, a voice channel, an electronic mail, and a messaging server.

5. The method of claim 1, wherein said step of selecting the recipient address by said criteria manager comprises:
   evaluating the communication mode capabilities of one or more recipient devices; and
   excluding a recipient device that is incapable of communicating with the communication mode indicated by the sender.

6. The method of claim 1, wherein said step of selecting the recipient address by said criteria manager comprises:
   determining past selections of said recipient addresses by said sender;
   said ranking of said recipient addresses based on past selections; and
   selecting said recipient addresses based on said ranking.

7. The method of claim 1, wherein said step of selecting the recipient address by said criteria manager comprises:
- determining prior selections of said recipient addresses by the criteria manager;
- said ranking of said recipient addresses based on said prior selections; and
- selecting said recipient addresses from the recipient addresses based on said prior selections.

8. The method of claim 1, wherein said step of selecting the recipient address by said criteria manager comprises:
- determining whether the recipient device is present with a recipient; and
- excluding said recipient device if said recipient is not present.

9. The method of claim 1, wherein said step of selecting the recipient address by said criteria manager comprises:
- determining whether the recipient is present with a recipient device;
- determining a nature of said presence; and
- selecting said recipient device based on said nature of said presence.

10. The method of claim 1, wherein said step of selecting the recipient address by said criteria manager comprises:
- determining a recipient's preference for selecting said recipient address;
- ranking said recipient address based upon said recipient's preference; and
- selecting said recipient address based upon said ranking.

11. The method of claim 1, wherein said step of selecting the recipient address by said criteria manager comprises:
- determining a sender's preference for selecting said recipient address;
- ranking said recipient address based upon said preferences; and
- selecting said recipient address based upon said ranking.

12. The method of claim 1, wherein said step of selecting the recipient address by said criteria manager comprises:
- determining a time when said sender communicates; and
- excluding or including the recipient address if said time is during a predetermined period.

13. The method of claim 1, wherein said step of selecting the recipient address by said criteria manager comprises:
- implementing a plurality of criteria including any of:
  - a sender's preferences, a recipient's preferences, sender'prior frequency of selection of said recipient addresses, recipient's prior frequency of selection of said recipient addresses, presence of said recipient with a recipient device, and time of communication.

14. The method of claim 1, wherein said step of communicating a selection of the recipient by the sender to the call manager comprises, selecting said recipient using voice commands.

15. The method of claim 1, wherein said communication mode indicated by the sender includes a messaging method comprising:
- transmitting a data file from said sender to a messaging server;
- associating said data file with a unique access address by said messaging server;
- transmitting said unique access address with a notification message;
- transmitting said notification message to said recipient;
- accessing said transmitted unique access address to retrieve said data file; and
- transmitting said data file from said messaging server to said recipient.

16. A computer-readable medium for programming a computer for selecting a recipient address from a plurality of recipient addresses by a sender for communicating with said recipient over a network, said medium including processor executable instructions comprising:
- selecting the recipient and communicating said selection by the sender to a call manager;
- determining a communication mode for each of said recipient addresses by the call manager, wherein said call manager uses a criteria manager to determine said communication mode;
- transmitting the identity of the recipient by said call manager to said criteria manager;
- applying a selection criteria by the criteria manager for determining the recipient address from said recipient addresses, wherein the selection criteria utilizes one or more of a profile of said sender and a communication mode in which the sender wishes to communicate;
- providing a preferred communication mode for communicating with the recipient by the criteria manager to the call manager; and
- selecting the recipient addresses by the criteria manager, wherein said selection is based on a ranking of the recipient address by the criteria sub-managers, and wherein said sub-managers comprises a history sub manager, presence sub-manager, recipient device capabilities sub-manager, recipient preferences sub-manager, time sub-manager, and a sender's preference sub-manager;
- wherein the history sub-manager is ranked the highest of the sub-manager and the history sub-manager determines the most frequently used recipient address based on past selections and selecting the most frequently used recipient address based on past selections by the criteria manager.

17. A call manager server for selecting a recipient address of a recipient with which a sender communicates over a telephony network comprising:
- means for communicating a selection of said recipient by said sender to a call manager;
- means for determining a communication mode for each of said recipient addresses by the call manager, wherein said call manager uses a criteria manager to determine said communication mode;
- means for transmitting the identity of the recipient by said call manager to said criteria manager;
- means for applying a selection criteria by the criteria manager for determining the recipient address from said recipient addresses, wherein said selection criteria utilizes one or more of profile of said sender input by the sender and indications from the sender; and
- means for selecting the recipient addresses by the criteria manager, wherein said selection is based on a ranking of the recipient address by the criteria sub-managers, and said wherein said sub-managers comprises a history sub-manager, presence sub-manager, recipient device capabilities sub-manager, recipient preferences sub-manager, time sub-manager, and a senders's preference sub manager;
- wherein the history sub-manager is ranked the highest of the sub-managers and the history sub-manager determines the most frequently used recipient address based on past selections and selecting the most frequently used recipient address based on past selections by the criteria manager.

18. The server of claim 17, wherein said network comprises any of a cellular network, public-switch telephone network, and voice over Internet protocol network.

* * * * *